United States Patent
Ueno et al.

(10) Patent No.: US 7,656,113 B2
(45) Date of Patent: Feb. 2, 2010

(54) DEVICE OF PULSE WIDTH MODULATION TYPE FOR LOAD DRIVE

(75) Inventors: Akihisa Ueno, Kyoto (JP); Fumihisa Watanabe, Shiga (JP); Daijiro Arisawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 312 days.

(21) Appl. No.: 11/907,340

(22) Filed: Oct. 11, 2007

(65) Prior Publication Data
US 2008/0088271 A1    Apr. 17, 2008

(30) Foreign Application Priority Data
Oct. 13, 2006   (JP)  ............... 2006-279349

(51) Int. Cl.
*H02P 7/29* (2006.01)
*G05B 11/28* (2006.01)
*H03K 7/00* (2006.01)

(52) U.S. Cl. ............... 318/599; 318/811; 327/175

(58) Field of Classification Search ............ 318/599, 318/728, 811; 327/172–175; 388/811, 819, 388/829, 831
See application file for complete search history.

(56) References Cited

U.S. PATENT DOCUMENTS

| | | | | |
|---|---|---|---|---|
| 4,587,605 A | * | 5/1986 | Kouyama et al. | 363/41 |
| 5,998,955 A | * | 12/1999 | Nishioka | 318/696 |
| 6,346,798 B1 | * | 2/2002 | Passoni et al. | 323/272 |
| 6,972,777 B2 | * | 12/2005 | Shigeta | 345/690 |
| 7,170,242 B1 | * | 1/2007 | Horng et al. | 318/400.11 |
| 7,501,781 B2 | * | 3/2009 | Horng et al. | 318/599 |
| 2005/0088156 A1 | * | 4/2005 | Cheung et al. | 323/282 |
| 2007/0248336 A1 | * | 10/2007 | Knab et al. | 388/804 |
| 2008/0008471 A1 | * | 1/2008 | Dress | 398/66 |
| 2009/0121801 A1 | * | 5/2009 | Cheng | 332/109 |

FOREIGN PATENT DOCUMENTS

JP     7-117841     12/1991

* cited by examiner

*Primary Examiner*—Walter Benson
*Assistant Examiner*—Eduardo Colon
(74) *Attorney, Agent, or Firm*—Steptoe & Johnson LLP

(57) ABSTRACT

A device of pulse width modulation type for load drive according to the present invention includes a first output unit (3) that applies a first output signal (e) to a load (5) in response to a first drive timing signal (c), a second output unit (4) that applies a second output signal (f) to the load (5) in response to a second drive timing signal (d), a signal converter (1) that converts a drive input signal (a) into a parallel signal (b), the drive input signal indicating time information allowing a potential difference to be generated across the load (5), and a drive timing generator (2) that generates the first and second drive timing signals (c, d) in response to the parallel signal (b), the load (5) being driven by increasing and reducing pulse widths of the first and second output signals (e, f).

3 Claims, 7 Drawing Sheets

US 7,656,113 B2

DEVICE OF PULSE WIDTH MODULATION TYPE FOR LOAD DRIVE

FIELD OF THE INVENTION

The present invention relates to a circuit for load drive and a device for load drive which drive a load such as a motor or an actuator which requires a relatively large load current (at least several hundred mA), and in particular, to a device of pulse width modulation type for load drive that controls a time width (differential voltage time width) over which a potential difference between output phases is made in accordance with a serial input having differential voltage time information.

BACKGROUND OF THE INVENTION

FIG. 8 shows a conventional device of pulse width modulation type for load drive, and FIG. 9 shows drive timings used by the device of pulse width modulation type for load drive.

A driving section 100 is composed of a drive timing generator 101, a first output unit 102, and a second output unit 103 to drive a load 104 on the basis of an analog drive input signal A shown in FIG. 9.

The drive timing generator 101 outputs a drive timing signal B and a drive timing signal C both shown in FIG. 9, on the basis of the level of a drive input signal A. The drive timing signals B and C, obtained by modulating the pulse width of the drive input signal A, are subjected to level conversion by the first and second output units 102 and 103, respectively. The resulting output signals D and E are applied to one end and the other end of the load 104, respectively. Consequently, current flows through the load 104 during a differential voltage interval t1 . . . as shown in FIG. 9.

Specifically, as shown in FIG. 9, the voltage value of the drive input signal A is captured into the drive timing generator 101 at any timing. If the voltage value of the drive input signal A is greater than that of a reference voltage, the drive timing generator 101 generates the drive timing signals B and C so as to increase the width of an interval during which the level of the first output signal D increases above the level of the second output signal E consistently with the absolute value of the amount of the differential voltage between the voltage of the drive input signal A and the reference voltage so that current flows through the load 104 from an output of the first output unit 102 toward an output of the second output unit 103. The drive timing generator 101 thus controls the differential component between the output signals D and E (two pulse-like output signals in respective phases) output by the first and second output units 102 and 103 to drive the load 104.

If the voltage value of the drive input signal A is smaller than that of the reference voltage, the drive timing generator 101 generates the drive timing signals B and C so as to increase the width of an interval during which the level of the second output signal E increases above the level of the first output signal D consistently with the absolute value of the amount of the differential voltage between the voltage of the drive input signal A and the reference voltage so that current flows through the load 104 from the output of the second output unit 103 toward the output of the first output unit 102. The drive timing generator 101 thus controls the differential component between the output signals D and E (two pulse-like output signals in respective phases) output by the first and second output units 102 and 103 to drive the load 104.

If the voltage value of the drive input signal A is equal to that of the reference voltage, the drive timing generator 101 generates the drive timing signals B and C so that the level of the first output signal D equals that of the second output signal E. The drive timing generator 101 thus controls the differential component between the output signals D and E (two pulse-like output signals in respective phases) output by the first and second output units 102 and 103 to drive the load 104.

DISCLOSURE OF THE INVENTION

However, to drive a motor or an actuator, the conventional configuration requires a load driving current of at least several hundred mA in order to drive a single output section. When a driving device is formed on the same circuit board, an increase in the number of output sections makes it more likely to superimpose driving noise on a drive input signal that is an analog input voltage owing to the common impedance of circuit board wiring, particularly a power supply wire and a GND wire. This disadvantageously prevents output signals of an accurate expected pulse width from being obtained.

When a plurality of devices of pulse width modulation type for load drive are formed on the same semiconductor chip, the number of input terminals increases consistently with the number of output sections. The increased number of pins required for a package containing the semiconductor chip increases the area of the package itself. This disadvantageously increases the size of a circuit board mounting area.

The present invention solves the conventional problems. An object of the present invention is to provide a device of pulse width modulation type for load drive which resists noise and which, even with a plurality of output sections, allows each of the output sections to provide an accurate pulse-like output signal, enabling a reduction in the number of input terminals required.

A device of pulse width modulation type for load drive according to the present invention includes a first output unit that applies a first output signal to one end of a load in response to a first drive timing signal, a second output unit that applies a second output signal to the other end of the load in response to a second drive timing signal, a signal converter that converts a drive input signal into a parallel signal, the drive input signal being a serial signal indicating, in any number of bits, time information (hereinafter referred to as differential voltage time information) allowing a potential difference to be generated across the load during each predetermined interval, and a drive timing generator that generates the first and second drive timing signals in response to the parallel signal, wherein the load is driven by increasing and reducing pulse widths of the first and second output signals.

Furthermore, the drive timing generator has a drive determining unit that generates a drive determining signal indicating a result of determination of to which of the first and second output units the drive timing signal having a pulse width corresponding to the differential voltage time information is to be passed, on the basis of one of the drive input signal and the parallel signal as well as the last first and second drive timing signals, or one of the drive input signal and the parallel signal as well as the last first and second output signals, wherein the first and second drive timing signals corresponding to one of the current drive input signal and the current parallel signal are generated in accordance with the drive determining signal.

A device of pulse width modulation type for load drive according to the present invention includes a signal converter that converts a serial signal having differential voltage time information and output section information into a parallel signal, an output section determining unit that receives the parallel signal having the output section information as an input to generate a parallel signal capturing instruction and an output start timing instruction, and a plurality of output sections provided in association with a plurality of loads, each of the plurality of output sections including a register which captures the parallel signal having the differential voltage time information in response to the parallel signal capturing instruction, a drive timing signal generator that uses the parallel signal stored in the register to start generating a drive timing signal in response to the output start timing instruction, and an output unit that generates an output signal in response to the drive timing signal, wherein the plurality of loads are driven by the serial signal.

With the device of pulse width modulation type for load drive according to the present invention, compared to a configuration requiring analog input signals the number of which is at least the same as that of the output sections, the present configuration uses the digital signals to enable the effective generation of the pulse-like output signals having the accurate differential component without interfering with the input information even if crosstalk from different wiring or a large current flowing through the common impedance causes noise to be superimposed on the serial signal, which is the input signal.

Furthermore, the device of pulse width modulation type for load drive according to the present invention uses the serial input to reduce the number of input signal lines required, enabling a reduction in wiring area. The device also consecutively passes differential voltage time information to the plurality of output sections, allowing outputs to be completed in a pipelined manner, compared to a configuration in which the output is not started until an input operation has been completed on all the output sections. Further, the device requires a reduced area when the circuits are constructed on a semiconductor so as to drive the plurality of output sections using the single signal converter.

DESCRIPTION OF THE EMBODIMENTS

First Embodiment

Figure 1:
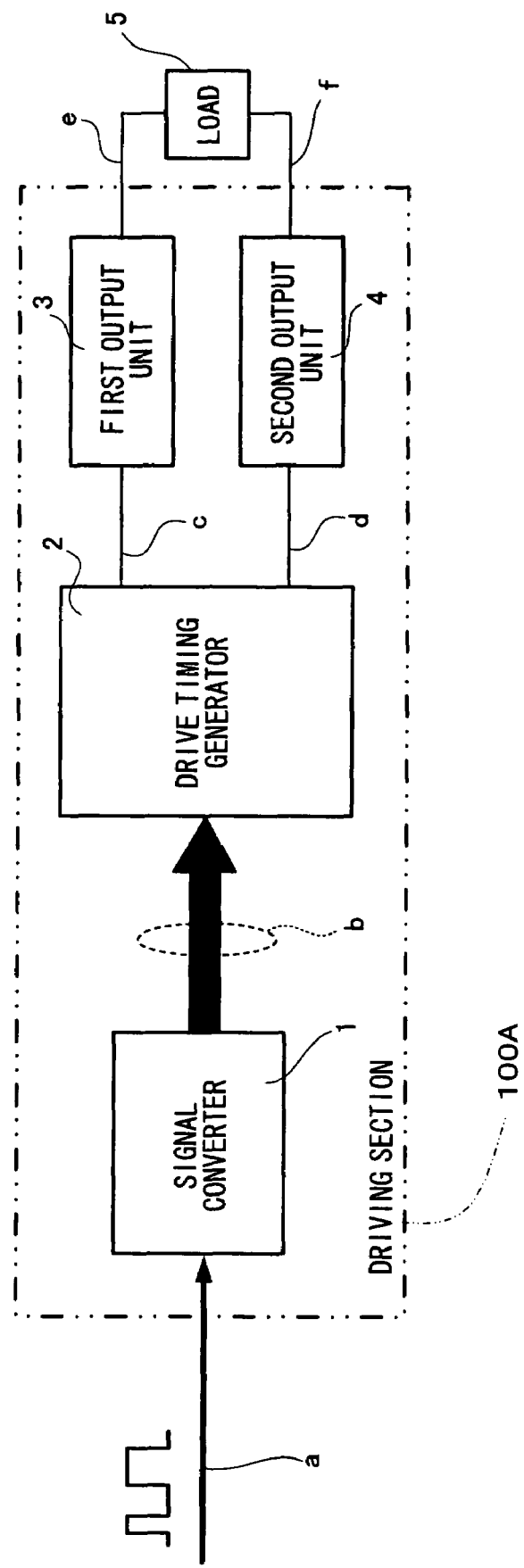
FIG. 1 is a block diagram of a device of pulse width modulation type for load drive according to a first embodiment of the present invention.
Figure 2:
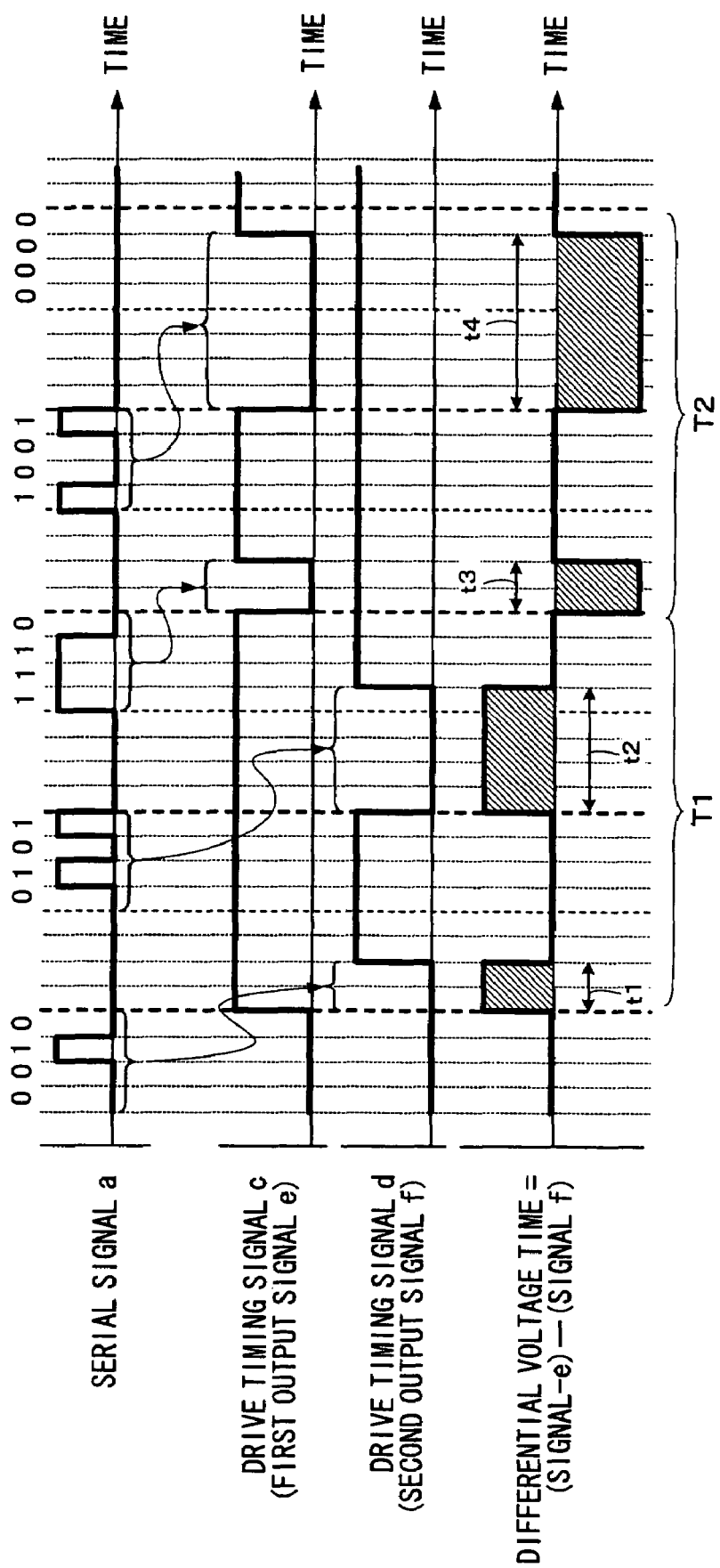
FIG. 2 is a timing chart of the first embodiment.

FIG. 1 shows a device of pulse width modulation type for load drive according to a first embodiment of the present invention. FIG. 2 shows drive timings used by the device of pulse width modulation type for load drive.

A driving section 100A is composed of a signal converter 1, a drive timing generator 2, a first output unit 3, and a second output unit 4 to drive a load 5 on the basis of a serial signal a as a drive input signal shown in FIG. 2.

The signal converter 1 receives the serial signal a as an input to output a parallel signal b.

The drive timing generator 2 receives the parallel signal b as an input signal to generate drive timing signals c and d shown in FIG. 2.

The first output unit 3 receives the drive timing signal c as an input signal and changes the level of the drive timing signal c, and applies the resulting first output signal e to one end of the load 5.

The second output unit 4 receives the drive timing signal d as an input signal and changes the level of the drive timing signal d, and applies the resulting second output signal f to the other end of the load 5.

Consequently, current flows through the load 5 during differential voltage intervals t1, t2, t3, t4, ... as shown in FIG. 2.

The serial signal a contains differential voltage time information indicating intervals during which a differential component is present between the first output signal e and the second output signal f. The differential voltage time information is expressed as a binary number of any bit number n and means that a differential voltage time width of a maximum of nth power of 2 resolution can be controlled. The signal converter 1 receives the serial signal a of n bits as an input and converts the serial signal into the parallel signal b of n bits.

On the basis of the differential voltage time information in the parallel signal b, the drive timing generator 2 uses a down counter or a bit converting circuit to generate the drive timing signals c and d varying in accordance with the nth power of 2 resolution.

Operation will be specifically described with reference to FIG. 2.

For description, the direction in which current flows from an output of the first output unit 3 toward an output of the second output unit 4 via the load 5 is defined as a positive direction. The opposite direction is defined as a negative direction. An interval T1 is an interval during which the first and second output units 3 and 4 are controlled to allow current to flow in the positive direction. An interval T2 is an interval during which the first and second output units 3 and 4 are controlled to allow current to flow in the negative direction. For example, during the interval T1, the first output signal e always maintains a voltage of an "H" level and operates to allow current to flow through the load 5 in the positive direction only during intervals in which the output signal 2 is at an "L" level. In contrast, during the interval T2, the second output signal f always maintains a voltage of the "H" level and operates to allow current to flow through the load 5 in the negative direction only during intervals in which the first output signal e is at the "L" level.

In this case, on the basis of the 1-bit (in this case, the leading bit) information contained in the parallel signal b and indicating the positive or negative direction, the drive timing generator 2 determines whether the output unit drives current to flow through the load 5 in the positive direction or the negative direction to generate the drive timing signals c and d so as to perform the following operation. When the information indicates the positive direction (in this case, the leading bit is 0), the first output signal e is set to the "H" level, whereas the second output signal f is at the "L" level only during the time indicated by the differential voltage time information contained in the serial signal a. In contrast, when the information indicates the negative direction (in this case, the leading bit is 1), the second output signal f is set to the "H" level, whereas the first output signal e is at the "L" level only during the time indicated by the differential voltage time information contained in the serial signal a. The first and second output units 3 and 4 operate to output the first and second output signals e and f to one end and the other end of the load 5, respectively, in response to the drive timing signals c and d.

This configuration uses the digitalized serial signal a, that is, the drive input signal, as the input signal to the signal converter 1. Thus, the load 5 can be driven at a desired pulse width even if a load current or crosstalk causes noise to be superimposed on the serial signal a, that is, the drive input signal.

Second Embodiment

Figure 3:
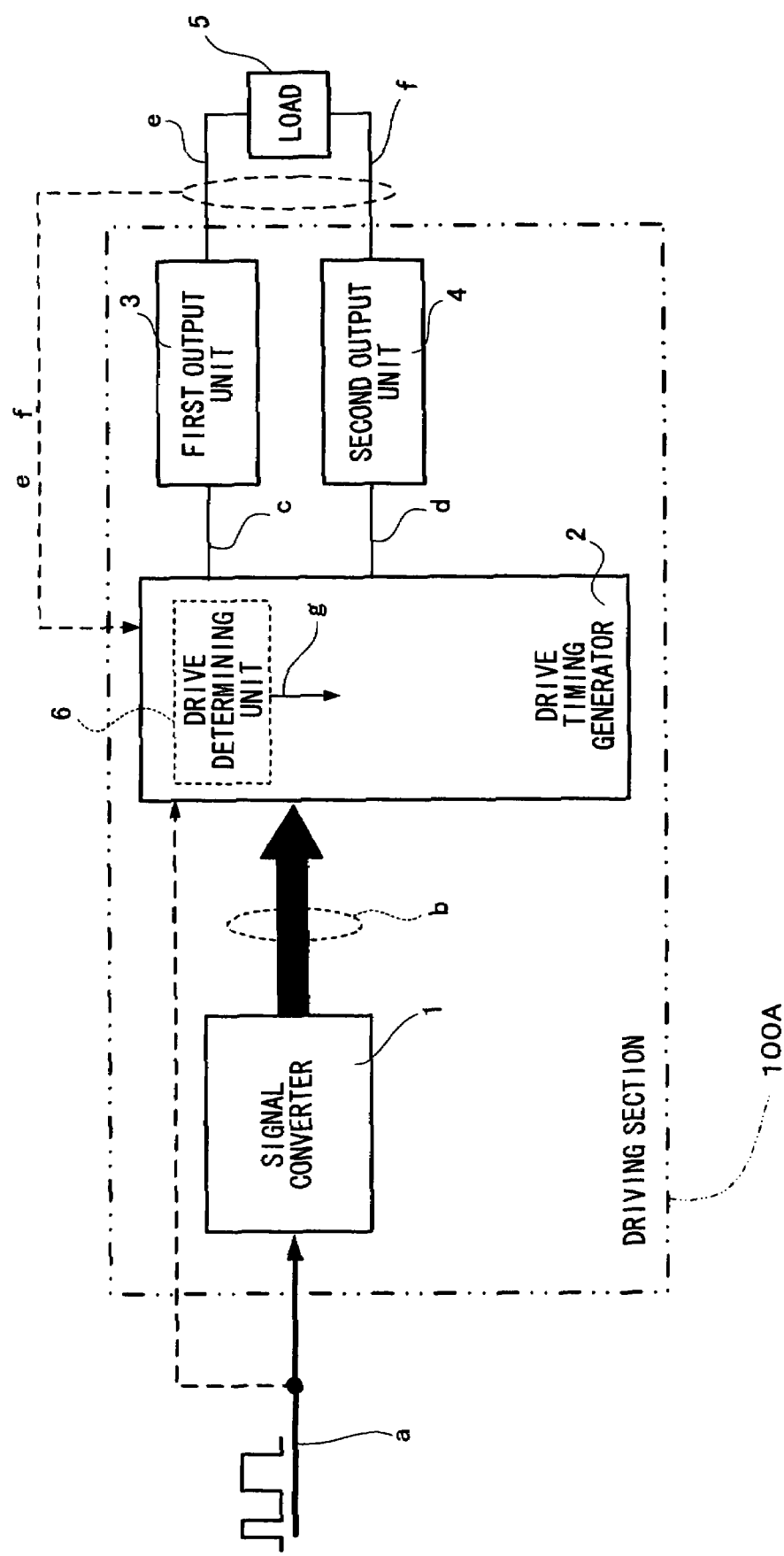
FIG. 3 is a block diagram of a device of pulse width modulation type for load drive according to a second embodiment of the present invention.
Figure 4:
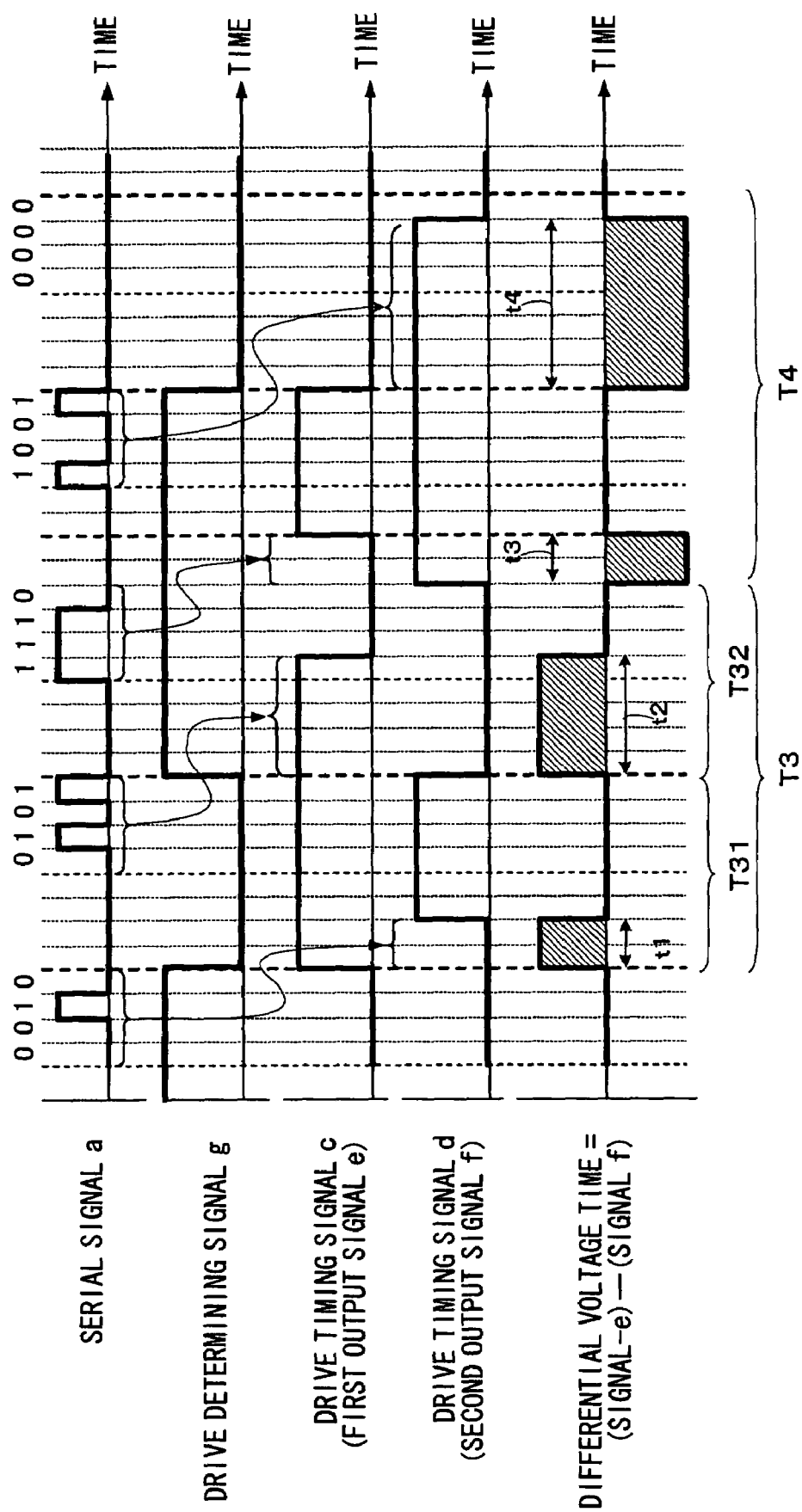
FIG. 4 is a timing chart of the second embodiment.

FIG. 3 shows a device of pulse width modulation type for load drive according to a second embodiment of the present invention. FIG. 4 is a timing chart of the device of pulse width modulation type for load drive.

FIG. 3 differs from FIG. 1 in that the drive determining unit 6 is provided in the drive timing generator 2. The drive determining unit 6 generates a drive determining signal g corresponding to the result of the determination, based on the current drive input signal a and the last first and second drive timing signals c and d, of the direction of current flowing through the load 5 and the initial voltages of the first and second output signals e and f output at the next start of generation of the differential voltage. In accordance with the information in the drive determining signal g, the drive timing generator 2 determines, via the drive timing signals c and d, the initial voltages of the first and second output signals e and f output at the start of generation of the differential voltage after reception of the serial signal a. The other arrangements are the same as those in the first embodiment. The drive determining signal g can also be generated by the current drive input signal a and by the last first and second output signals e and f as shown by a dashed line in FIG. 3. Alternatively, even if the last first and second drive timing signals c and d or the first and second output signals e and f are used, the drive timing generator 2 can create the drive determining signal g by using the current parallel signal b instead of the current drive input signal a.

With reference to FIG. 4, a specific description will be given of the operation of the drive determining unit 6 and the drive timing generator 2, having the drive determining unit 6.

In FIG. 4, during an interval T3, the first and second output units 3 and 4 are controlled to allow current to flow in the positive direction. During an interval T4, the first and second output units 3 and 4 are controlled to allow current to flow in the negative direction. When the leading bit of the serial signal a, shown in FIG. 4, is 0 and the first output signal e output immediately before the timing (start timings for intervals T31 and T32) at which the reception of the serial signal a is completed is at the "L" level, the drive determining unit 6 outputs the drive determining signal g at the "L" level. When the leading bit of the serial signal a is 0 and the first output signal e output immediately before the timing at which the reception of the serial signal a is completed is at the "H" level, the drive determining unit 6 outputs the drive determining signal g at the "H" level.

Further, when the leading bit of the serial signal a is 1 and the first output signal e output immediately before the timing at which the reception of the serial signal a is completed is at the "L" level, the drive determining unit 6 outputs the drive determining signal g at the "H" level. When the leading bit of the serial signal a is 1 and the first output signal e output immediately before the timing at which the reception of the serial signal a is completed is at the "H" level, the drive determining unit 6 outputs the drive determining signal g at the "L" level.

When the drive determining signal g is at the "H" level, the drive timing generator 2 outputs the drive timing signal d such that the second output signal f is maintained at a given voltage until the reception of the next serial signal a is completed. The drive timing generator 2 further outputs the drive timing signal c such that the pulse width of the first output signal e varies depending on the differential voltage time information contained in the serial signal a.

When the drive determining signal g is at the "L" level, the drive timing generator 2 outputs the drive timing signal c such that the first output signal e is maintained at a given voltage until the reception of the next serial signal a is completed. The drive timing generator 2 further outputs the drive timing signal d such that the pulse width of the second output signal f varies depending on the differential voltage time information contained in the serial signal a.

When the leading bit of the serial signal a is 0 and not all the bits of the serial signal a are 0, the drive timing generator 2 outputs the drive timing signals c and d such that the first output signal e output immediately after the reception of the serial signal a has an initial value of the "H" level and such that the second output signal f output immediately after the reception of the serial signal a has an initial value of the "L" level.

When the leading bit of the serial signal a is 1, the drive timing generator 2 outputs the drive timing signals c and d such that the first output signal e output immediately after the reception of the serial signal a has an initial value of the "L" level and such that the second output signal f output immediately after the reception of the serial signal a has an initial value of the "H" level.

When all the bits of the serial signal a are 0, the drive timing generator 2 outputs the drive timing signals c and d such that the initial values of the first and second output signals e and f output immediately after the reception of the serial signal a correspond to the same potential.

For example, during the interval T3, the leading bit of the serial signal a is 0 and not all the bits of the serial signal a are 0. The output signal states of the output signals 1 and 2 output immediately before the interval T31 both correspond to the "L" level, and at this time, the drive determining signal g is at the "L" level. The drive timing generator 2 then outputs the drive timing signal c such that the first output signal e is fixed at the "H" level and such that the pulse width (the interval width for the "L" level) of the second output signal f is controlled in accordance with the differential voltage time information contained in the serial signal a input immediately before the interval T31. Further, the output signal states of the output signals 1 and 2 output immediately before the interval T32 both correspond to the "H" level, and at this time, the drive determining signal g is at the "H" level. The drive timing generator 2 outputs the drive timing signal c such that the pulse width (the interval width for the "H" level) of the first output signal e is controlled in accordance with the differential voltage time information contained in the serial signal a input immediately before the interval T32. The drive timing generator 2 further outputs the drive timing signal d allowing the second output signal f to be fixed at the "L" level.

At this time, on the basis of one of the drive input signal a and the parallel signal b as well as the last first and second drive timing signals c and d or one of the drive input signal a and the parallel signal b as well as the last first and second output signals e and f, the drive determining unit 6 generates the drive determining signal g indicating a result of determination of to which of the first and output units 3 and 4 the drive timing signal g having the pulse width corresponding to the differential voltage time information is to be passed; the drive determining signal g is an internal instruction signal for the drive timing signal generator 2 indicating that one of the current drive timing signals c and d is to be fixed at the "H" or "L" level, whereas the other output signal is to be driven like a pulse. The drive timing generator 2 counts the time for which a differential voltage is generated between the first and second output signals e and f in accordance with the differential voltage time information contained in the serial signal a, to generate a pulse-like timing signal appropriate for the differential voltage time. The drive timing generator 2 determines to which of the output units the drive timing signal output is to be passed, in accordance with the drive determining signal g, and outputs the drive timing signals c and d.

In the above description, when the drive determining unit 6 generates the drive determining signal g, the current first and second output signals e and f and the serial signal a are used. However, similar effects can of course be produced even if the parallel signal b and the drive timing signals c and d are used or the drive timing signal generator 2 uses the parallel signal b to determine the leading bit.

With this configuration, even when crosstalk associated with wiring or a large current flowing through the common impedance on the substrate may cause noise to be superimposed on the serial signal, which is the input signal, the digital signals allow the pulse-like output signals having the accurate differential component to be generated without interfering with input information.

In contrast to the first embodiment, even with a complicated driving scheme using a plurality of output units all outputting pulse-like signals, the drive determining unit 6 has a function of determining which of the output units has the output set to a given voltage after serial input reception in accordance with the output state of the output unit before the serial input reception and which of the output units has the output pulse-controlled so as to generate a differential voltage for the differential voltage time specified by the serial input signal. On the basis of the drive determining signal g, corresponding to the determination result, the drive timing generator 2 can generate the drive timing signal to drive the load via the output units.

Third Embodiment

Figure 5:
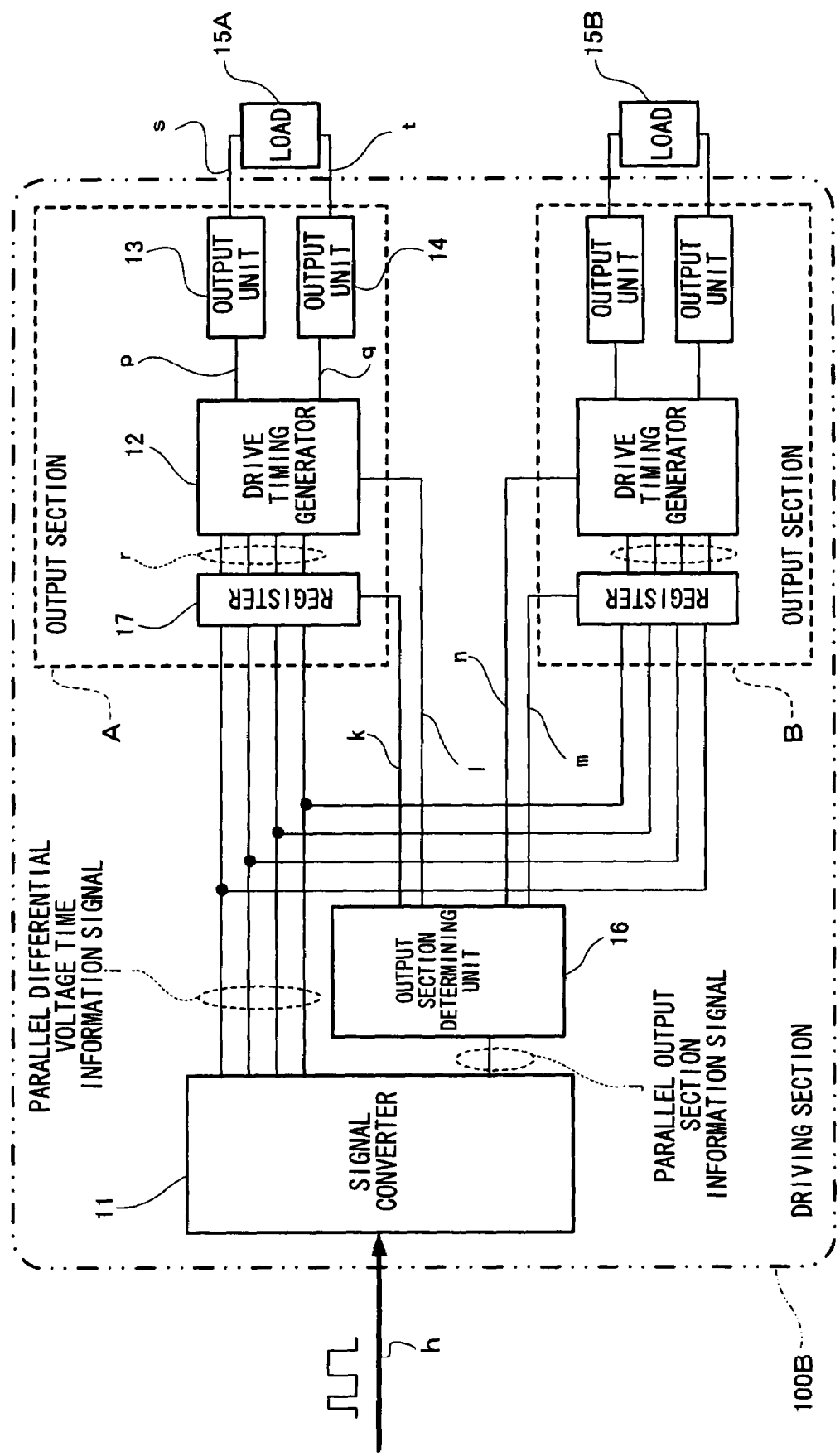
FIG. 5 is a block diagram showing a basic configuration of a device of pulse width modulation type for load drive according to a third embodiment of the present invention.
Figure 6:
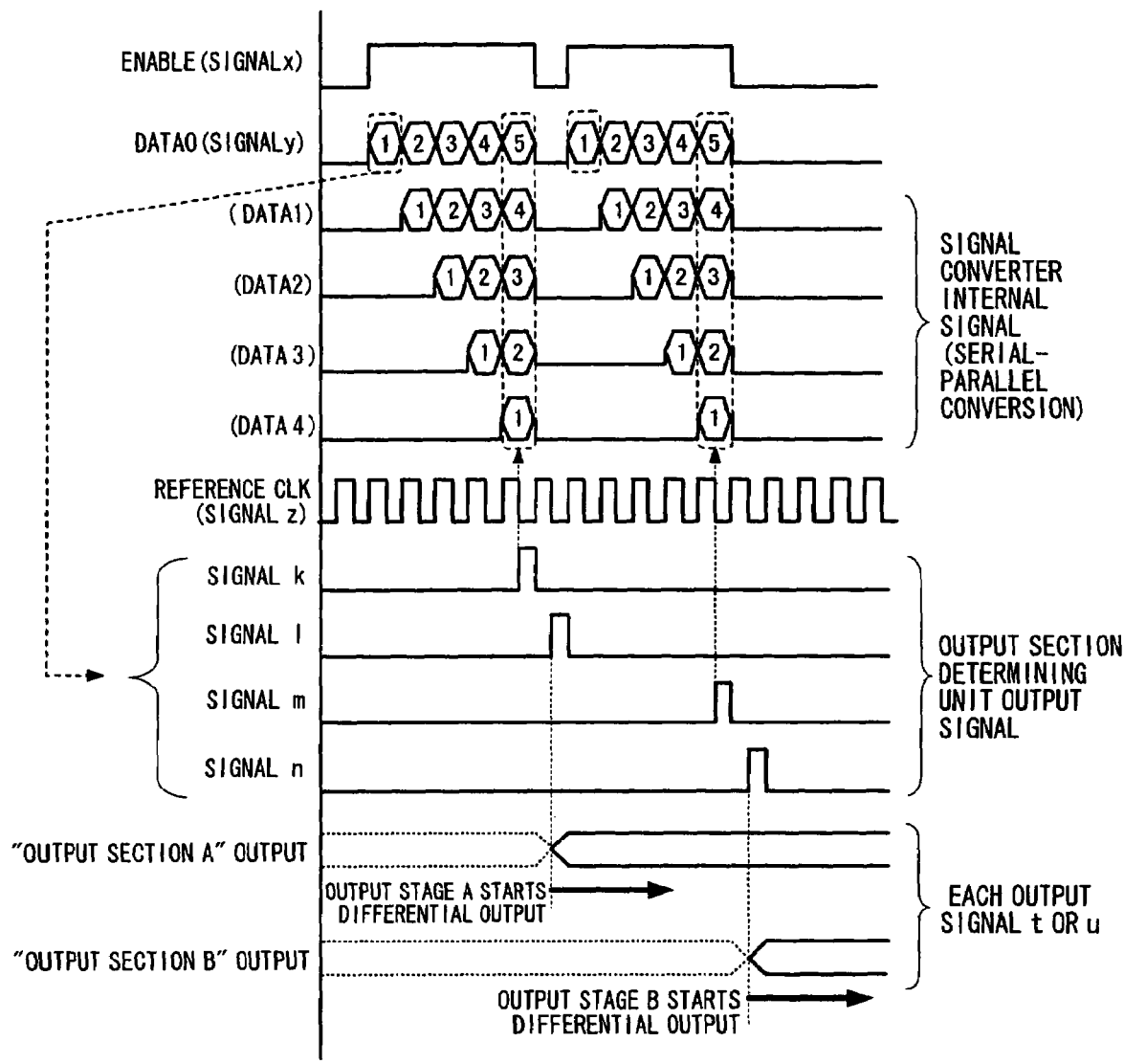
FIG. 6 is a timing chart of the third embodiment.
Figure 7:
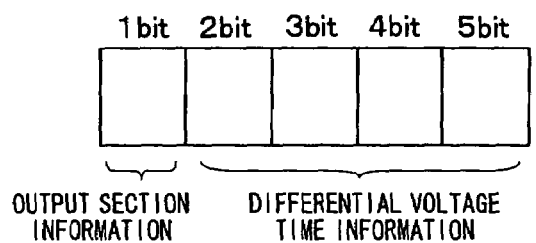
FIG. 7 is a diagram showing an example of the format of a serial input signal according to the third embodiment.
Figure 8:
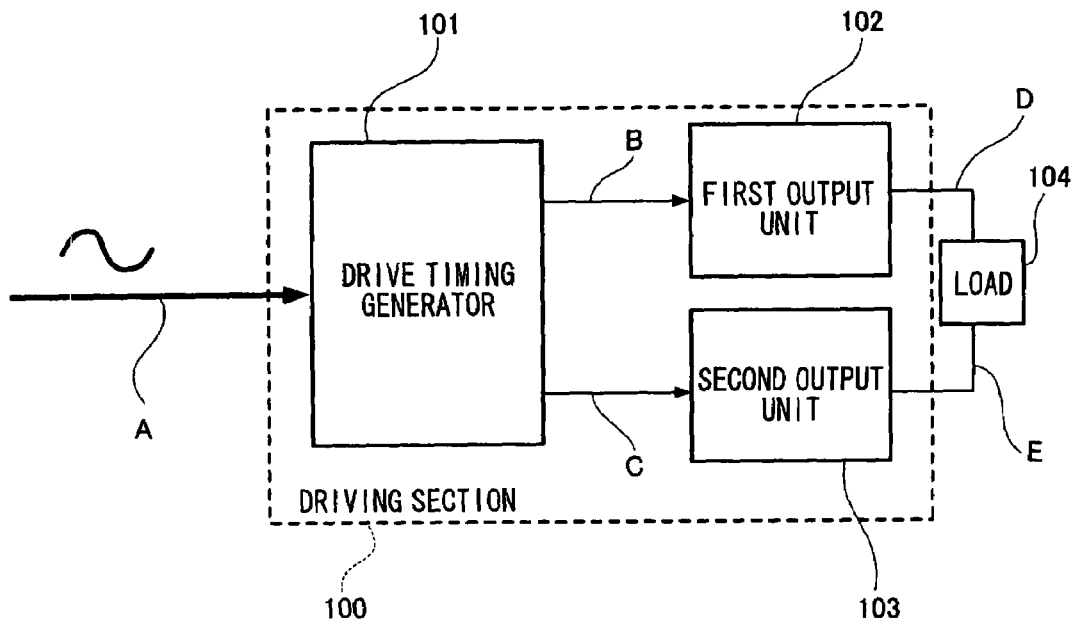
FIG. 8 is a block diagram showing a conventional example.
Figure 9:
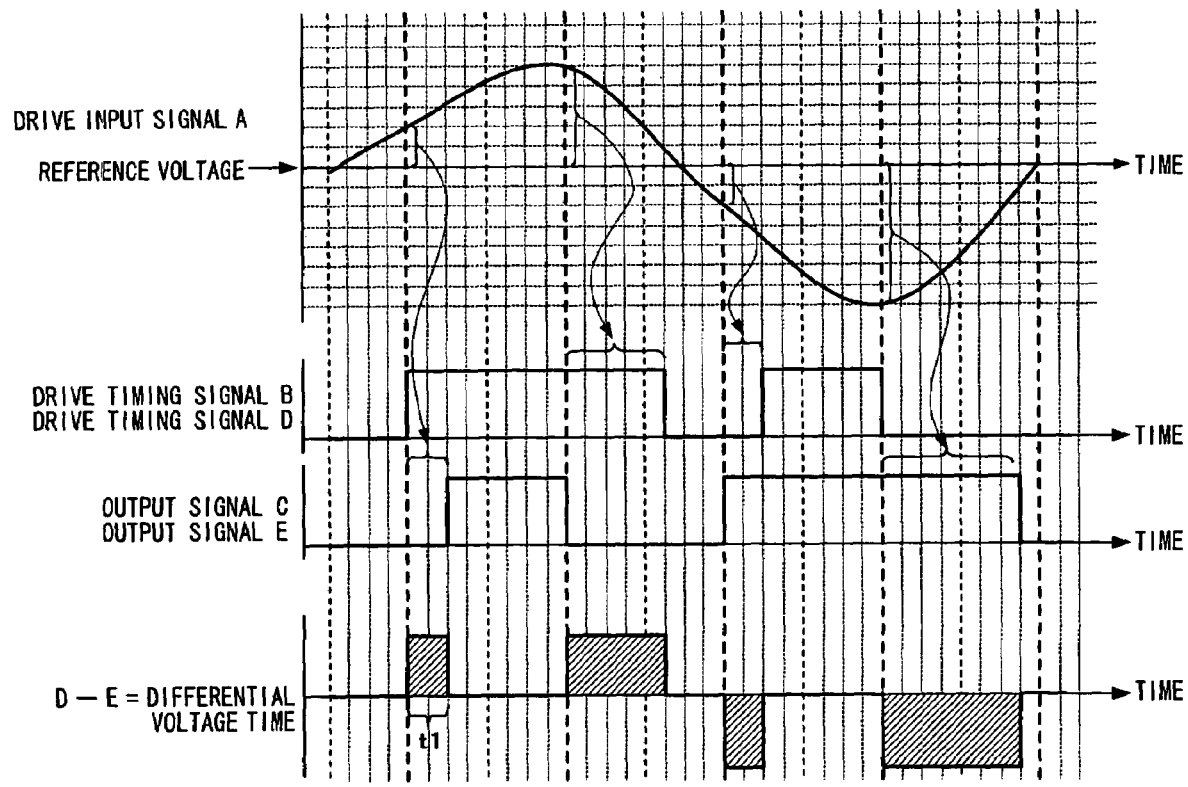
FIG. 9 is a timing chart of the conventional example.

FIG. 5 shows a device of pulse width modulation type for load drive according to a third embodiment of the present invention. FIG. 6 is a timing chart. FIG. 7 shows an example of a serial input signal as a drive input signal.

A signal converter 11, a drive timing generator 12, and output units 13 and 14 in a driving section 100B in FIG. 5 correspond to the signal converter 1, drive timing generator 2, and first and second output units 3 and 4 according to the first and second embodiments.

The third embodiment differs from the first and second embodiments in that the third embodiment has an output section A driving a load 15A and an output section B driving a load 15B and that only one signal converter 11 and one output section determining unit 16 are provided for the two output sections A and B.

In FIG. 5, the signal converter 11 uses, as an input, a serial signal h that is a drive input signal containing output section information and differential component information and outputs a parallel differential voltage time information signal i and a parallel output section information signal j.

The output section determining unit 16 outputs parallel signal capturing instruction signals k and m and output start timing instruction signals l and n to the output section specified by the parallel output section information signal j.

Each of the output sections A and B is composed of the drive timing generator 12, the output unit 13, the output unit 14, and a register 17.

The register 17 is configured to capture the parallel differential voltage time information signal i at a timing specified by the parallel signal capturing instruction signal k or m.

On the basis of the parallel differential voltage time information signal i captured into the register 17, the drive timing generator 12 starts generating drive timing signals p and q at a timing specified by the output start timing instruction signal l or n.

The output unit 13 converts the level of the drive timing signal p output by the drive timing generator 12 to output a first output signal s.

The output unit 14 converts the level of the drive timing signal q output by the drive timing generator 12 to output a second output signal t.

As shown by an input signal in FIG. 7, which is an example of a serial signal, the information contained in the serial signal h includes the output section information, indicating one of the plurality of output sections, and the differential voltage time information, indicating an interval during which the first output signal s and the second output signal t have a differential component. The differential voltage time information is as described in the first embodiment.

The signal converter 11, to which the n-bit serial signal h is input, converts the serial signal into a parallel signal to generate the parallel differential voltage time information signal i and the parallel output section information signal j. The output section determining unit 16 generates, for the output section specified by the parallel output section information on signal j, the parallel signal capturing instruction signals k and m, indicating timings when the parallel differential voltage time information signal i is captured into the register 17, included in each output section, and the output start timing instruction signals l and n, indicating start timings when the drive timing generator 12, to which the parallel differential voltage time information signal i captured into the register 17 is input, outputs the drive timing signals p and q.

In this case, the drive timing generator 12 receives the parallel differential voltage time information signal captured in the register 17 as an input and drives the loads 15A or 15B through such a process as described in the first embodiment.

Each block operation will be described with reference to the operation timing chart and serial input signal example in FIGS. 6 and 7, respectively.

For description, it is assumed that the serial signal h conforms to a three-wire serial scheme and has an ENABLE signal (signal x), a DATA0 signal (signal y), and a reference CLK signal (signal z) and that DATA0 (signal y) has 5 bits of information including 1 bit of output section information and 4 bits of differential voltage time information as shown in FIG. 7.

The ENABLE signal (signal x) is at the "H" level during an interval when the DATA0 (signal y) has information and is at the "L" level during an interval when the DATA0 (signal y) has no information. In this case, the signal converter 11 captures the DATA0 (signal y), serial data, only during the interval when the ENABLE signal (signal x) is at the "H" level. The signal converter 11 shifts the data bit by bit in response to rising edges of a reference CLK signal (signal z) like DATA0 to DATA4, which are parallel signals. The signal converter 11 counts the CLK number of the reference CLK signal (signal z) from a rising edge of the ENABLE signal (signal x) and completes the conversion of the serial signal into the parallel signal simultaneously with the fifth rising edge. The signal converter 11 finishes the bit shifting at the same time as when the ENABLE signal (signal x) is set to the "L" level.

In this case, the information in the parallel signals DATA0 to DATA4 (parallel differential voltage time information signal i) is captured into the registers 17 in the output sections specified by the output section information (1 bit) at the rising edge of the parallel signal capturing instruction signals k and m output by the output section determining unit 16. The parallel signals r, the captured information, are passed to the drive timing generator 12.

The drive timing generator 12 uses the parallel signals r or the first and second output signals s and t, or the internal counter to determine the initial voltages of the first and second output signals s and t output immediately after the rising edges of the output start timing instruction signals l and n for the first and second output signals s and t output by the output sections A and B. The drive timing generator 12 determines the initial voltages of the drive timing signals p and q so that the first and second output signals s and t have the desired initial voltages. The drive timing generator 12 determines the pulse widths of the drive timing signals p and q so that the bit converting circuit and the down counter are used to set a differential voltage time width corresponding to the differential voltage time information signal i between the first output signal s and the output signal t on the basis of the timings of the rising edges of the output start timing instruction signals l and n, in accordance with the differential voltage time information (4 bits) contained in the parallel differential voltage time information signal i. The drive timing generator 12 thus generates the drive timing signals p and q.

The first output unit 13 and the second output unit 14 shift the levels of the drive timing signals p and q to output the first and second output signals s and t.

This configuration can produce the following effects. Even if the serial input causes noise associated with the common impedance or crosstalk from different wiring to be superimposed on the input, output signals can be obtained which have accurate pulse widths specified by the input. The output sections the number of which is greater than that of the input terminals can be driven. Utilizing the characteristic that the serial input is consecutive signals, it is possible to use the single signal converter in chronological order to generate parallel signals for the plurality of output sections. Shifting the output timings for the plurality of differential voltage time outputs enables power supply ripples to be suppressed.

In the above description, the serial signal is based on the 3-wire serial signal scheme. However, similar effects can of course be exerted even if the serial signal is based on a single-wire scheme or a 2-wire scheme or an internal oscillation clock is used instead of the external reference clock, or regardless of the number of bits contained in the data.

The present invention uses the serial input signal to enable the accurate pulse width to be output in spite of possible noise superimposition. This contributes to reducing the number of terminals required for drivers for motors and various actuators as well as the number of required external parts. This in turn contributes to reducing the substrate mounting area.

What is claimed is:

1. A device of pulse width modulation type for load drive comprising:
    a first output unit that applies a first output signal to one end of a load in response to a first drive timing signal;
    a second output unit that applies a second output signal to the other end of the load in response to a second drive timing signal;
    a signal converter that converts a drive input signal into a parallel signal, the drive input signal being a serial signal indicating, in any number of bits, time information allowing a potential difference to be generated across the load during each predetermined interval; and
    a drive timing generator that generates the first and second drive timing signals in response to the parallel signal, wherein
    the load is driven by increasing and reducing pulse widths of the first and second output signals.

2. The device of pulse width modulation type for load drive according to claim 1, wherein the drive timing generator has a drive determining unit that generates a drive determining signal indicating a result of determination of to which of the first and second output units the drive timing signal having a pulse width corresponding to the differential voltage time information is to be passed, on the basis of one of the drive input signal and the parallel signal as well as the last first and second drive timing signals, or one of the drive input signal and the parallel signal as well as the last first and second output signals, wherein
    the first and second drive timing signals corresponding to one of the current drive input signal and the current parallel signal are generated in accordance with the drive determining signal.

3. A device of pulse width modulation type for load drive comprising:
    a signal converter that converts a serial signal having differential voltage time information and output section information into a parallel signal;
    an output section determining unit that receives the parallel signal having the output section information as an input to generate a parallel signal capturing instruction and an output start timing instruction; and
    a plurality of output sections provided in association with a plurality of loads,
    each of the plurality of output sections comprising:
    a register which captures the parallel signal having the differential voltage time information in response to the parallel signal capturing instruction;
    a drive timing signal generator that uses the parallel signal stored in the register to start generating a drive timing signal in response to the output start timing instruction; and
    an output unit that generates an output signal in response to the drive timing signal, wherein
    the plurality of loads are driven by the serial signal.

* * * * *